(12) United States Patent
De Keyser et al.

(10) Patent No.: US 10,379,951 B2
(45) Date of Patent: *Aug. 13, 2019

(54) HIERARCHIC STORAGE POLICY FOR DISTRIBUTED OBJECT STORAGE SYSTEMS

(71) Applicant: Western Digital Technologies, Inc., Irvine, CA (US)

(72) Inventors: Koen De Keyser, Sint-Denijs Westrem (BE); Frederik Jacqueline Luc De Schrijver, Wenduine (BE); Stijn Blyweert, Huizingen (BE)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,364

(22) Filed: Sep. 12, 2018

(65) Prior Publication Data

US 2019/0012235 A1    Jan. 10, 2019

Related U.S. Application Data

(63) Continuation of application No. 15/394,559, filed on Dec. 29, 2016, now Pat. No. 10,078,552.

(51) Int. Cl.
  *G06F 11/00* (2006.01)
  *G06F 11/10* (2006.01)
  (Continued)

(52) U.S. Cl.
  CPC ........ *G06F 11/1076* (2013.01); *G06F 3/0604* (2013.01); *G06F 3/064* (2013.01);
  (Continued)

(58) Field of Classification Search
  CPC .... G06F 11/1068; G06F 11/10; G06F 3/0604; G06F 3/0619
  See application file for complete search history.

(56) References Cited

U.S. PATENT DOCUMENTS 5,809,492 A * 9/1998 Murray .................. G06N 5/022
                                                      706/45
5,889,953 A * 3/1999 Thebaut .................. G06F 21/30
                                                      709/221

(Continued)

OTHER PUBLICATIONS

International Search Report and Written Opinion, PCT/US2017/049507, dated Nov. 8, 2017 (14 pages).

*Primary Examiner* — Esaw T Abraham
(74) *Attorney, Agent, or Firm* — Patent Law Works LLP

(57) ABSTRACT

Techniques for distributing data in a distributed data storage system using a hierarchy rule that is generated based on a spreading policy and a set of tolerable failures specified by a user in absence of system deployment information are disclosed. The system includes a controller node which receives a request including a spreading policy and a protection level for spreading a first data object. The controller node determines a hierarchy rule corresponding to the spreading policy based on the protection level. The controller node distributes the first data object in the system using the hierarchy rule and the spreading policy. The controller node receives a reconfiguration of system deployment. The controller node distributes a second data object in the system based on providing protection of the protection level to the second data object without affecting protection of the same protection level applied to the first data object.

20 Claims, 7 Drawing Sheets

(51) Int. Cl.
 *G06F 3/06* (2006.01)
 *H04L 29/08* (2006.01)
 *G06F 16/185* (2019.01)
(52) U.S. Cl.
 CPC ............ *G06F 3/067* (2013.01); *G06F 3/0619* (2013.01); *G06F 3/0629* (2013.01); *G06F 3/0631* (2013.01); *G06F 16/185* (2019.01); *H04L 67/1097* (2013.01); *G06F 11/10* (2013.01)

(56) References Cited

U.S. PATENT DOCUMENTS

| | | | |
|---|---|---|---|
| 5,907,844 A * | 5/1999 | Guay | G06F 17/30306 |
| 6,327,618 B1 * | 12/2001 | Ahlstrom | H04L 41/0213 370/254 |
| 6,381,639 B1 * | 4/2002 | Thebaut | G06F 21/30 709/221 |
| 7,146,524 B2 | 12/2006 | Patel et al. | |
| 7,685,126 B2 | 3/2010 | Patel et al. | |
| 7,747,736 B2 | 6/2010 | Childress et al. | |
| 8,112,395 B2 | 2/2012 | Patel et al. | |
| 8,145,941 B2 * | 3/2012 | Jacobson | G06F 11/1076 714/6.24 |
| 8,281,182 B2 * | 10/2012 | Resch | G06F 12/0646 714/42 |
| 8,572,330 B2 | 10/2013 | Kottomtharayil et al. | |
| 9,690,660 B1 | 6/2017 | Robins et al. | |
| 9,716,617 B1 | 7/2017 | Ahuja et al. | |
| 2010/0185963 A1 * | 7/2010 | Slik | G06F 17/30082 715/764 |
| 2011/0113282 A1 * | 5/2011 | De Spiegeleer | G06F 11/1076 714/6.13 |
| 2012/0166726 A1 * | 6/2012 | De Schrijver | G06F 11/2094 711/114 |
| 2016/0070617 A1 | 3/2016 | Algie et al. | |
| 2016/0246676 A1 | 8/2016 | Bakre et al. | |

* cited by examiner

HIERARCHIC STORAGE POLICY FOR DISTRIBUTED OBJECT STORAGE SYSTEMS

CROSS REFERENCE TO RELATED APPLICATION

This application is a continuation of and claims priority to U.S. application Ser. No. 15/394,559, entitled "Hierarchic Storage Policy for Distributed Object Storage Systems," filed Dec. 29, 2016 and issued on Sep. 18, 2018 as U.S. Pat. No. 10,078,552, which is incorporated by reference in its entirety.

BACKGROUND

The present disclosure relates to a distributed data storage system. In particular, the present disclosure relates to distributing data in the distributed data storage system using a hierarchy rule that is generated based on a spreading policy and a set of tolerable failures specified by a user without knowledge of the deployment of the distributed data storage system.

There are many storage systems for storing data in a reliable way, for example, using redundancy. Some data distribution algorithms used in the storage systems even allow a user to define a protection level by describing what kind of failure scenarios can be tolerated, such that data can still be recovered even after such a failure occurs. However, such description is impacted by the layout of the storage system and may cause the storage system to malfunction when entities (e.g., data storage devices, storage nodes, racks, data centers) are added to or removed from the system. For example, if a new entity is added to the system, every write of new data and every reconstruction of old data (e.g., the data already stored in the system) would cause the data to be spread out over all entities of the system including the newly added entity. This is problematic because the new entity and the old entities are not the same size, and therefore the benefits of these entities are not the same. This is further problematic because the old data may have a different protection guarantee than the new data.

SUMMARY

The present disclosure relates to systems and methods for distributing data in a distributed data storage system using a hierarchy rule that is generated based on a spreading policy and a set of tolerable failures specified by a user in absence of deployment information of the distributed data storage system.

According to one innovative aspect, the subject matter described in this disclosure may be embodied in computer-implemented methods that include receiving a request for spreading data of a first data object, the request including a spreading policy and a protection level, the protection level including a set of tolerable failures from which the first data object can be recovered; determining a hierarchy rule corresponding to the spreading policy based on the protection level; distributing the data of the first data object in a distributed object storage system using the hierarchy rule and the spreading policy; receiving a reconfiguration of a hierarchical deployment of the distributed object storage system, the reconfiguration including adding one or more entities to the distributed object storage system; and distributing data of a second data object in the distributed object storage system based on providing protection of the protection level to the second data object without affecting protection of the same protection level applied to the first data object, the protection including recovering the data of both the first data object and the second data object when the set of tolerable failures occur.

Other implementations of one or more of these aspects include corresponding systems, apparatus, and computer programs, configured to perform the actions of the methods, encoded on computer storage devices. It should be understood that the language used in the present disclosure has been principally selected for readability and instructional purposes, and not to limit the scope of the subject matter disclosed herein.

BRIEF DESCRIPTION OF THE DRAWINGS

The techniques of the present disclosure are illustrated by way of example, and not by way of limitation in the figures of the accompanying drawings in which like reference numerals are used to refer to similar elements.

DETAILED DESCRIPTION

Systems and methods for distributing data in a distributed data storage system using a hierarchy rule that is generated based on a spreading policy and a set of tolerable failures specified by a user without knowledge of the deployment of the distributed data storage system are described below. While the systems and methods of the present disclosure are described in the context of a particular system architecture, it should be understood that the systems and methods can be applied to other architectures and organizations of hardware.

Figure 1:
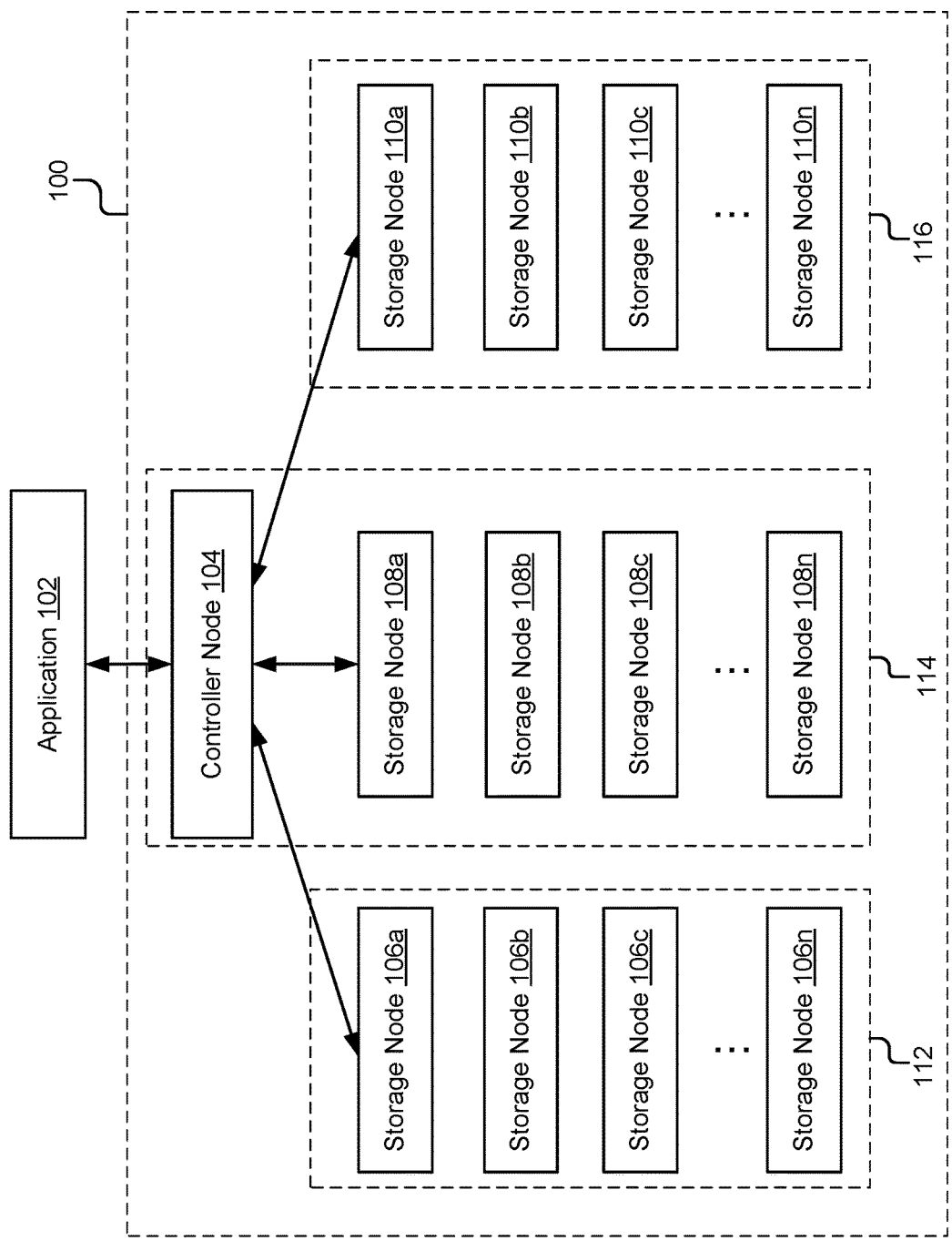
FIG. 1 is a high-level block diagram illustrating an example distributed object storage system.

FIG. 1 is a high-level block diagram illustrating an example distributed object storage system 100 that is accessed by an application 102. In some embodiments, the application 102 is a software application running on a computing device that interacts with the system 100. The computer device may be, for example, a laptop computer, a desktop computer, a tablet computer, a mobile telephone, a personal digital assistant, a mobile email device, a portable game player, a portable music player, a television with one or more processors embedded therein or coupled thereto or any other electronic device capable of making requests to the system 100 and receiving responses from the system 100. In other embodiments, the application 102 comprises a file system that enables a general purpose software application to interface with the system 100 or an Application Programming Interface library.

The application 102 provides the data for storage in the system 100. The application 102 also requests the data stored in the system 100. For example, the application 102 may be a file transfer application that requests for storing a first set of data in the system 100 and retrieving a second set of data from the system 100. In some embodiments, the data is in the form of a data object. The data object comprises the data (e.g., 128-megabyte binary data) and a data object identifier. The data object identifier is a universally unique identifier used for identifying and addressing the data object. Storing data in the form of a data object, also referred to as object storage, is more advantageous than conventional file or block based storage on scalability and flexibility, which are of particular importance to large scale redundant storage in a distributed object storage system as shown in FIG. 1.

The distributed object storage system 100 as depicted in FIG. 1 includes a controller node 104, and storage nodes 106a . . . 106n, 108a . . . 108n, and 110a . . . 110n. The controller node 104 may be a computing device configured to make some or all of the storage space for storage of the data provided by the application 102. For example, the controller node 104 generates rules for distributing data of a data object based on user input and determines where to store the data of the data object based on the rules. In some embodiments, the controller node 104 is physically located at a data center, where the controller node 104 along with a plurality of storage nodes 106a . . . 106n, 108a . . . 108n, and 110a . . . 110n are arranged in modular racks as described below.

The storage nodes 106a . . . 106n, 108a . . . 108n, and 110a . . . 110n are computer devices configured to store the data. For example, the storage nodes 106a . . . 106n, 108a . . . 108n, and 110a . . . 110n comprise a plurality of storage elements (e.g., data storage devices or blockstores) for storing the data. In some embodiments, the storage nodes 106a . . . 106n, 108a . . . 108n, and 110a . . . 110n are divided into groups based on, for example, whether the storage nodes are housed in a single rack. In the example of FIG. 1, the storage nodes 106a . . . 106n are grouped into rack 112, the storage nodes 108a . . . 108n are grouped into rack 114, and the storage nodes 110a . . . 110n are grouped into rack 116. In FIG. 1, the controller node 104 is also located in rack 114 as indicated by the dash-lined box of rack 114. The racks can be geographically dispersed across different data centers, for example, racks 112 and 114 can be located at a data center in Europe, while rack 116 can be located at a data center in the United States. Although a single controller node 104 and storage nodes of three racks are shown in FIG. 1, it should be understood that there may be any number of controller nodes 104, storage nodes, or racks. Also the storage nodes 106a . . . 106n may be collectively referred as storage nodes 106. Similarly, the storage nodes 108a . . . 108n and 110a . . . 110n may be respectively referred as storage nodes 108 and 110.

The application 102, the controller node 104, and the storage nodes 106, 108, 110 are interconnected in a data communication network for distributing data of a data object. The data communication network can be a conventional type, wired or wireless, and may have numerous different configurations including a star configuration, token ring configuration, or other configurations. Furthermore, the data communication network may include a local area network (LAN), a wide area network (WAN) (e.g., the internet), and/or other interconnected data paths across which multiple devices (e.g., a computing device comprising the application 102, the controller node 104, the storage nodes, etc.) may communicate. In some embodiments, the data communication network may be a peer-to-peer network. The data communication network may also be coupled with or include portions of a telecommunications network for sending data using a variety of different communication protocols. In some embodiments, the data communication network may include Bluetooth (or Bluetooth low energy) communication networks or a cellular communications network for sending and receiving data, including via short messaging service (SMS), multimedia messaging service (MMS), hypertext transfer protocol (HTTP), direct data connection, wireless application protocol (WAP), email, etc.

Figure 2:
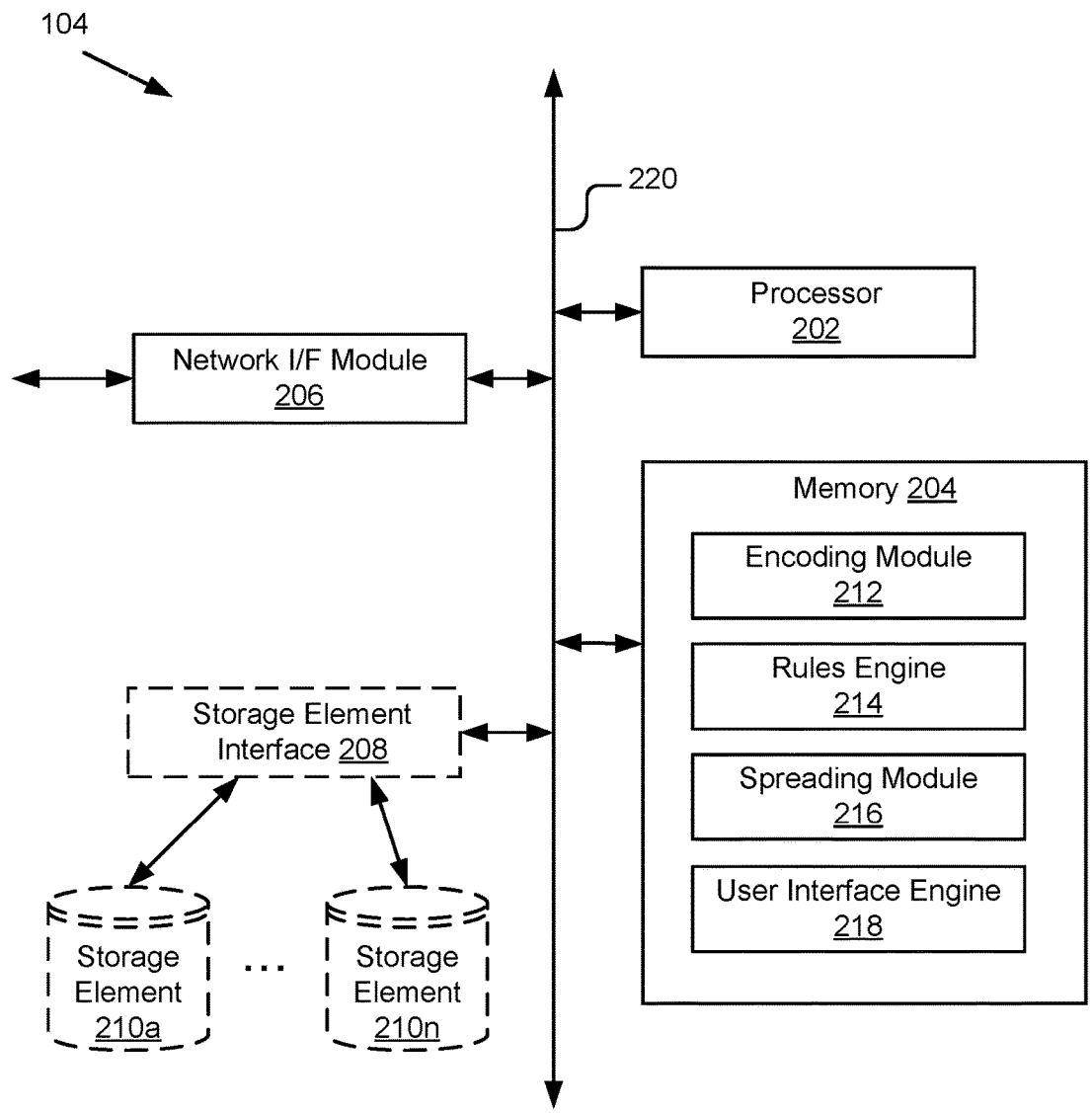
FIG. 2 is a block diagram illustrating an example controller node of the distributed object storage system configured to implement the techniques introduced herein.

FIG. 2 is a block diagram illustrating an example controller node 104 of the distributed object storage system 100 in FIG. 1. In the example of FIG. 2, the controller node 104 includes a processor 202, a memory 204, a network interface (I/F) module 206, and an optional storage element interface 208. The components of the controller node 104 are communicatively coupled to a bus or software communication mechanism 220 for communication with each other.

The processor 202 may include an arithmetic logic unit, a microprocessor, a general purpose controller or some other processor array to perform computations and provide electronic display signals to a display device. In some embodiments, the processor 202 is a hardware processor having one or more processing cores. The processor 202 is coupled to the bus 220 for communication with the other components. Processor 202 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 2, multiple processors and/or processing cores may be included. It should be understood that other processor configurations are possible.

The memory 204 stores instructions and/or data that may be executed by the processor 202. In the illustrated embodiment, the memory 204 includes an encoding module 212, a rules engine 214, a spreading module 216, and a user interface engine 218. The memory 204 is coupled to the bus 220 for communication with the other components of the controller node 104. The instructions and/or data stored in the memory 204 may include code for performing the techniques described herein. The memory 204 may be, for example, non-transitory memory such as a dynamic random access memory (DRAM) device, a static random access memory (SRAM) device, flash memory, or some other memory device. In some embodiments, the memory 204 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

The network interface module 206 is configured to connect the controller node 104 to a data communication network. For example, the network interface module 208 may enable communication through one or more of the internet, cable networks, and wired networks. The network interface module 206 links the processor 202 to the data communication network that may in turn be coupled to other processing systems. The network interface module 206 also provides other conventional connections to the data communication network for distribution and/or retrieval of data objects (e.g., files and/or media objects) using standard network protocols such as Transmission Control Protocol/Internet Protocol (TCP/IP), Hypertext Transfer Protocol (HTTP), Secure Hypertext Transfer Protocol (HTTPS), and Simple Mail Transfer Protocol (SMTP) as will be understood. In some embodiments, the network interface module 206 includes a transceiver for sending and receiving signals using WiFi, Bluetooth®, or cellular communications for wireless communication.

In some embodiments, the controller node 104 may include or be included in one of the storage nodes 106, 108, or 110 that performs both the function of a controller node and a storage node. In such a case, the controller node 104 includes a storage element interface 208 and one or more storage elements 210a . . . 210n connected via the storage element interface 208 to perform the functions of a storage node. For example, the storage element interface 208 may comprise a Serial Advanced Technology Attachment (SATA) interface or a Small Computer System Interface (SCSI) for connecting the storage elements 210a . . . 210n (e.g., ten 2 TB SATA-II disk drives) to other components of the controller node 104. The storage element interface 208 is configured to control the reading and writing of data to/from the storage elements 210a . . . 210n. For example, the controller node 104 can use the storage element interface 208 to retrieve the data requested by the application 102 from the storage elements 210a . . . 210n that store the data.

The distributed object storage system 100 in FIG. 1 includes redundant and independently operated storage elements 210 such that, if one particular storage element fails, the function of the failed storage element can easily be taken on by another storage element. In addition, the types, capacity, manufacturers, hardware technology, storage interfaces, etc. of the storage elements can be different based on the storage elements being redundant and independently operated, which benefits the scalability and flexibility of the distributed object storage system 100. For example, a storage element can be easily added or removed without correlating to other storage elements already in use in the distributed object storage system 100. When the system 100 is reconfigured (e.g., with the number of the storage elements changed), it is advantageous that the reconfiguration does not affect a protection level applied to the data that was already stored on the storage elements of the system 100. The protection level includes a set of failures that can be tolerated ("tolerable failures"), such that a data object can still be recovered even after such a failure occurs. For example, a protection level can provide that a data object stored on storage elements of storage nodes 106, 108, and 110 can be recovered from two concurrent data storage device failures. When new entities (e.g., data storage devices, storage nodes, racks, data centers, etc.) are added to the system 100, the distributing algorithm described herein guarantees that data objects stored before the new entities were added to the system 100 are still under the same level of protection (e.g., the data objects can still survive from two concurrent data storage device failures).

Software communication mechanism 220 may be an object bus (e.g., Common Object Request Broker Architecture (CORBA)), direct socket communication (e.g., TCP/IP sockets) among software modules, remote procedure calls, User Datagram Protocol (UDP) broadcasts and receipts, HTTP connections, function or procedure calls, etc. Further, any or all of the communication could be secure (e.g., Secure Shell (SSH), HTTPS, etc.). The software communication mechanism 220 can be implemented on any underlying hardware, for example, a network, the Internet, a bus, a combination thereof, etc.

In the illustrated embodiment of FIG. 2, the controller node 104 comprises an encoding module 212, a rule engine 214, a spreading module 216, and a user interface engine 218. The encoding module 212, stored on memory 204 and configured to be executed by the processor 202, disassembles a data object received from the application 102 into a predetermined number of redundant sub-blocks or pieces to be stored across storage elements of the distributed object storage system. A distributed object storage system not only stores a data object on a plurality of storage elements, but also guarantees that the data object can be correctly retrieved when a certain number of the plurality of storage elements are unavailable (e.g., inaccessible, damaged). The encoding module 212 uses erasure coding techniques to disassemble a data object to achieve acceptable reliability with considerably less overhead than a standard replication scheme.

In some embodiments, the encoding module 212 disassembles the data object into data pieces based on a spreading policy included in a storage request. The spreading policy may be defined as a spreading width (W) over a maximum concurrent failure tolerance (F). The spreading width indicates the number of data storage devices that store the pieces of the data object, where each data storage device stores a piece of data object. The maximum concurrent failure tolerance indicates a number of data storage devices that store the pieces of the data object that are allowed to fail concurrently. The spreading width and the maximum concurrent failure tolerance satisfy the relationship $W=K+F$, where K is a minimum spreading requirement (i.e., the minimum number of data storage devices that store pieces of the data object and are not allowed to fail to successfully recreate the data object).

The encoding module 212 using a W/F encoding scheme greatly reduces the overhead as compared to standard replication schemes. In some embodiments, the encoding module 212 communicates with the user interface engine 218 to receive a spreading policy from a user. The user specifies a spreading policy for an individual object or a group of objects. For example, a user may specify a spreading policy for a group of objects for simplicity. In some embodiments, a decoding module (not shown) assembles the data pieces of a data object based on a unique object identifier associated with each piece of the data object to recover the data object.

The rules engine 214, stored on memory 204 and configured to be executed by the processor 202, generates a hierarchy rule corresponding to a spreading policy. The hierarchy rule identifies a maximum number of data storage devices on each hierarchy level of a hierarchic tree structure of the distributed object storage system 100 for spreading the data of the data object to.

Figure 3:
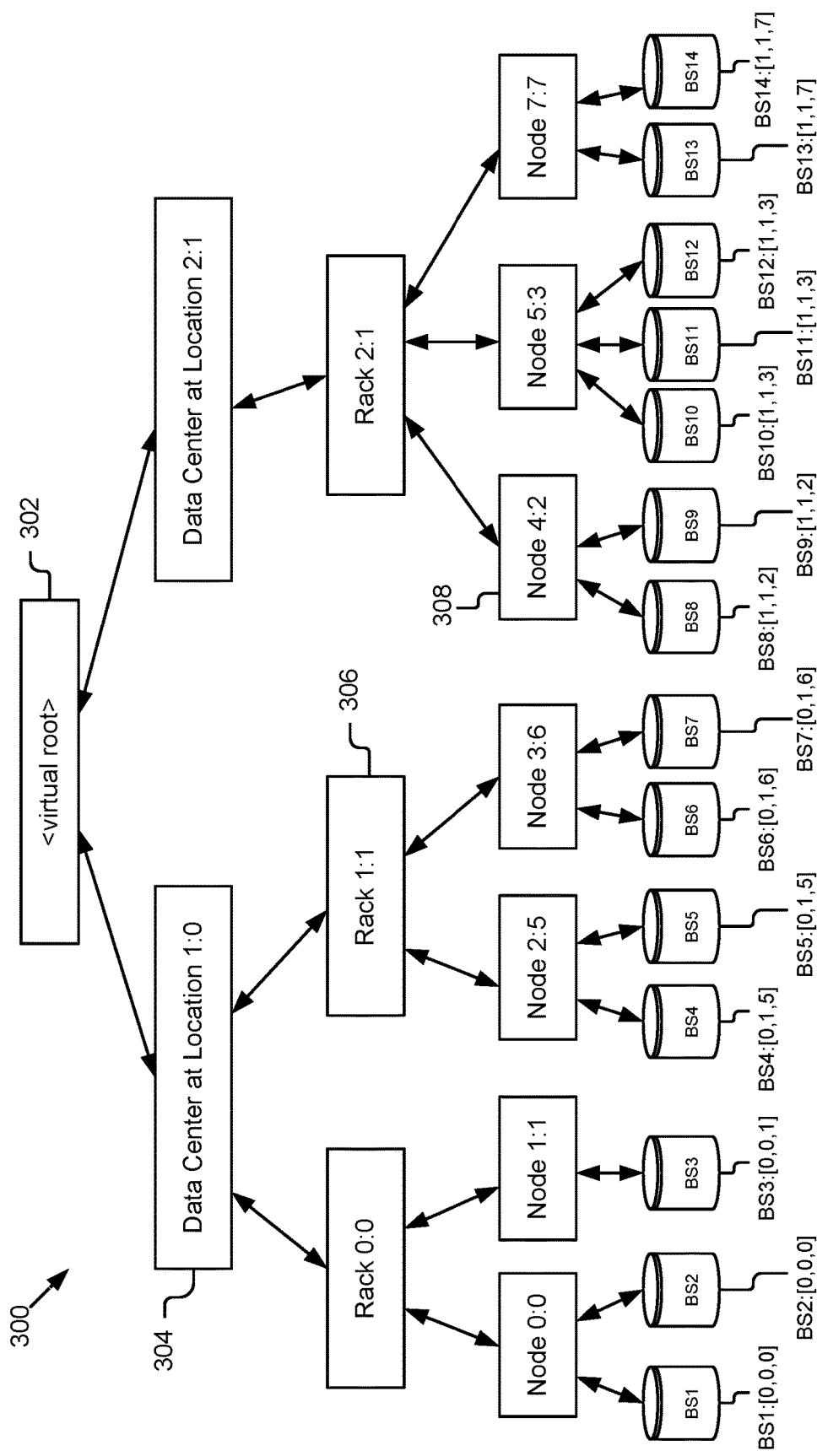
FIG. 3 is a block diagram illustrating an example hierarchic tree structure of the distributed object storage system.

Referring now to FIG. 3, an example hierarchic tree structure 300 of a distributed object storage system is shown. In the example of FIG. 3, the three levels of a hierarchical configuration of the distributed object storage system form a tree structure. The virtual root in 302 is not part of the three levels as it represents an interface to access the data that is stored or retrieved to/from the distributed object storage system. At the bottom level of the hierarchy 300 (i.e., the node level), the storage elements (e.g., data storage devices or blockstores) are grouped according to their respective storage nodes. In the example of FIG. 3, 14 data storage devices are grouped into 7 storage nodes at the node level. At the middle level of the hierarchy 300 (i.e., the rack level), the storage nodes are grouped according to their respective racks. In the example of FIG. 3, seven storage nodes are grouped into three racks at the rack level. At the top level of the hierarchy 300 (i.e., the data center level), the racks are grouped according to their respective data centers. In the example of FIG. 3, three racks are grouped into two data centers at the data center level.

Each entity in the hierarchy 300 has a unique name and a unique identifier. An entity can be a data center, a rack, a storage node, a data storage device, etc. For example, a data center 304 at the top level has a name "Data Center at Location 1" and an identifier "0," a rack 306 at the middle level has a name "Rack 1" and an identifier "1," and a storage node 308 at the bottom level has a name "Node 4" and an identifier "2." A data storage device has a hierarchy identifier comprising an array of integers. Each integer of a hierarchy identifier corresponds to an identifier of a data center, a rack and a node at a respective level of the hierarchy 300. These entities form a branch of the tree that ends up at the data storage device. For example, in FIG. 3, the rightmost data storage device at the bottom level has a name "BS14" and a hierarchy identifier "[1,1,7]." The numbers "1," "1," and "7" from left to right respectively correspond to identifiers of the "Data Center at Location 2," "Rack 2" and "Node 7" from top to bottom of a branch that ends at the data storage device BS14. In FIG. 3, the name and the identifier of an entity is separated by a colon.

A name of an entity is unique so that no two entities have a same name. An identifier of a data center at the top level is unique so that no data centers have a same identifier. For example, data centers in FIG. 3 are given unique identifiers 0 and 1. An identifier of a rack or a node is unique within a next higher level. In other words, racks are given unique identifiers within a data center. For example, in data center 0, the racks (i.e., Rack 0 and Rack 1) can have identifiers 0 and 1. In data center 1, the rack (i.e., Rack 2) can also have identifier 1. So every rack has a unique number within a specific data center. Similarly, down to the node level, the nodes are given unique identifiers within a rack (i.e., every node has a unique number within a specific rack). The unique names and identifiers associated with entities provide layout information of a distributed object storage system, which is useful for distributing a data object in the system.

One way to distribute data across multiple entities of the hierarchic tree structure of a distributed object storage system is based on a hierarchy rule. In some embodiments, a hierarchy rule is in the form of [n1, n2, n3], where the numbers n1, n2, and n3 respectively indicate a maximum number of data storage devices on each hierarchy level of the hierarchic tree structure (e.g., the data center level, the rack level, and the node level), for spreading data of a data object to. For example, if the hierarchy rule is [100, 90, 1], it means that a maximum 1 data storage device per node, a maximum 90 data storage devices per rack, and a maximum 100 data storage devices per data center can be used to spread the data of a data object in a storage operation. The rule engine 214 generates the hierarchy rule based on a spreading policy and a set of tolerable failures specified by a user.

The spreading policy W/F determines that W pieces of the data object need to be stored on W data storage devices with a tolerance for F concurrent data storage device failures. The protection level includes a set of tolerable failure scenarios specified by the user. The rule engine 214 translates the spreading policy into the number associated with each hierarchy level in the hierarchy rule based on the protection level according to certain logic. The four main points of the logic are described below with an example spreading policy W/F=18/5 and an example hierarchy rule [100, 100, 1].

First, if the maximum number associated with a hierarchy level in the hierarchy rule is greater than W of the spreading policy, the rule engine 214 determines that there is no restriction applied. Since the first 100 associated with the data center level and the second 100 associated with the rack level in the hierarchy rule [100, 100, 1] are greater than W=18 of the spreading policy, the rule engine 214 determines that no restriction is applied to the data center level and the rack level. In other words, there is no need to select multiple data centers or multiple racks to store the data. The 18 data pieces of a data object can be put on a single data center and a single rack because each data center and each rack can store at most 100 data pieces.

Second, if the maximum number associated with a hierarchy level in the hierarchy rule is less than W of the spreading policy, the rule engine 214 determines that not all data can be spread on a single entity of this hierarchy level. The number 1 associated with the node level in the hierarchy rule [100, 100, 1] is less than W=18 of the spreading policy, which means that 18 pieces of the data object cannot be stored on a single node. In fact, the number 1 at the node level indicates that a maximum 1 data storage device per node can be used to store the data, and therefore the rule engine 214 determines that the data object should be distributed to 18 nodes, with each node storing one piece of data.

Third, if the maximum number associated with a hierarchy level in the hierarchy rule is greater than F of the spreading policy, the rule engine 214 determines that a failure of a single entity at this hierarchy level cannot be tolerated. Since the number 100 associated with the data center level and the rack level in the hierarchy rule [100, 100, 1] is greater than F=5 of the spreading policy, a single data center failure and a single rack failure would violate the spreading policy. If a distribute object storage system includes only a data center and/or a rack, in such case, the original data object cannot be recovered.

Fourth, if the maximum number associated with a hierarchy level in the hierarchy rule is less than F of the spreading policy, the rule engine 214 determines that, in addition to a failure of a single entity at this hierarchy level, at least one further concurrent data storage device failure can be tolerated. The number 1 in the hierarchy rule [100, 100, 1] is less than F=5 of the spreading policy, which means that a single node failure at the node level as well as at least an additional concurrent data storage device failure can be tolerated. F=5 of the spreading policy indicates that up to five pieces of data can be lost without affecting recovery of the data object using the remaining 13 pieces of data. The number 1 in the hierarchy rule [100, 100, 1] indicates that each node stores only one piece of data (e.g., on a single data storage device of the node). Therefore, in this case, in addition to a single node failure, up to four other nodes can fail until a total of five data pieces are lost. Assuming that the hierarchy rule is changed to [100, 100, 2]. The number 2 indicates that at most two data pieces can be stored on a single node (e.g., one piece each on two data storage devices of the node). In this case, in addition to a single node failure (i.e., two data storage device failures) up to three other data storage devices or one other node can fail until a total of five data pieces is lost. Two node failures lead to the loss of four data pieces, which is still tolerable. However, three node failures will cause six data pieces to be lost, which exceeds the maximum number of concurrent failures F=5 and results in incapability of reconstructing and retrieving the data object.

In some embodiments, the rule engine 214 receives a set of tolerable failure scenarios specified by a user. The rule engine 214 generates the hierarchy rule based on a spreading policy and the set of tolerable failures specified by the user. For example, if the spreading policy is W/F=18/5, the rule engine 214 may determine multiple hierarchy rules such as [100, 100, 1], [100, 2, 100], [100, 100, 3] using the logic described above. Responsive to receiving a set of tolerable failure scenarios, the rule engine 214 refines the hierarchy rules. If a user specifies that up to two racks can fail, the rule engine 214 determines the hierarchy rule to be [100, 2, 100], for example. Since the rack level element of the hierarchy rules (i.e., the second number 100) [100, 100, 1] and [100, 100, 3] is greater than M=18, the rule engine 214 determines that there is no restriction. The 18 data pieces of the data object can be stored on a single rack. However, there is no guarantee that two rack failures can be tolerated, as requested by the user in the failure scenario, since the entire data object (18 pieces) may be stored on a single rack. The rule engine 214 therefore determines that the hierarchy rules [100, 100, 1] and [100, 100, 3] do not fulfill the user's requirement. On the other hand, since the product of the rack level element of the hierarchy rule [100, 2, 100] (i.e., 2) and the number of rack failures specified by the user (i.e., 2) is less than F=5 (i.e., 4), the rule engine 214 determines that the hierarchy rule [100, 2, 100] is sufficient when the user requires that up to two rack failures be tolerated.

It is advantageous that determining a spreading policy, a failure tolerance, and/or a hierarchy rule does not require information about the layout or deployment of a distributed object storage system. For example, a user may specify what kind of failures from which a data object can survive without knowledge of the hierarchical tree structure of the storage system and save the time associated with retrieving the extensive deployment information. In practice, the user may be provided a set of predefined policies that cover most common use cases and a description about what kind of failures that a data object may survive, which further simplifies the user's task for specifying failures and minimizes the user's need for knowledge about how the storage system works.

The spreading module 216, stored on memory 204 and configured to be executed by the processor 202, selects data storage devices in the distributed object storage system 100 to store a data object using a hierarchy rule and a spreading policy. In some embodiments, responsive to receiving a request for spreading a data object in a distributed object storage system 100, the rule engine 214 determines a hierarchy rule [n1, n2, n3] based on a spreading policy W/F and a protection level included in the request, and transfers the hierarchy rule to the spreading module 216. The spreading module 216 identifies a hierarchical deployment configuration of the system 100, and determines whether the hierarchy rule is compatible with the hierarchical deployment configuration. Responsive to the hierarchy rule being compatible with the hierarchical deployment configuration, the spreading module 216 identifies which data storage devices in the system 100 should be used for storing the data and transfers the data to the identified data storage devices for storing.

As described above, given a number of data pieces for a data object W and a number of data pieces that can be lost F, and given a set of tolerable failure scenarios that the data object is able to survive, the rule engine 214 generates the maximum number of data centers, racks, and nodes used to store a data object (i.e., the hierarchy rule). The generation of the hierarchy rule does not relate to the hierarchical deployment configuration of a distributed object storage system. Therefore, it is possible that the hierarchy rule may not be compatible with the hierarchical deployment configuration. The spreading module 216 determines whether the hierarchy rule is compatible with the hierarchical deployment configuration by determining whether each entity of a hierarchy level meets the maximum number of data storage devices associated with the hierarchy level without receiving information of data storage devices used at other entities of the hierarchy level. For example, a user selects a spreading policy W/F=18/5 that defines a data object be distributed into 18 pieces such that failure of up to five pieces can be tolerated and a protection level that defines that the failure of a single data center can be tolerated. As a result, the rule engine 214 determines that no more than 5 pieces of data can be put on any single data center, and creates a maximum number of 5 on the data center level of a hierarchy rule. The spreading module 216 receives this hierarchy rule and identifies that the actual hierarchical deployment configuration of the distributed object storage system includes only two data centers to fulfill this rule. Because of the maximum number of 5 on the data center level of the hierarchy rule, at most 10 data pieces can be stored between the two data centers, which is less than 18 data pieces selected in the spreading policy. The spreading module 216 therefore determines that the hierarchy rule is incompatible with the hierarchical deployment of the system because the entire data object cannot be stored according to the user selected protection level. When the spreading module 216 determines that the hierarchy rule corresponding to a spreading policy cannot be fulfilled by the hierarchical layout or deployment of the distributed object storage system, the spreading module 216 communicates with the user interface engine 218 to notify the user of the incompatibility and instruct the user to modify at least one of the spreading policy and the protection level such that the hierarchy rule is compatible with the hierarchical deployment configuration.

If the spreading module 216 determines that the hierarchy rule is compatible with the hierarchical deployment configuration of the distributed object storage system, the spreading module 216 selects the data storage devices for storing the pieces of the data object using the hierarchy rule and the spreading policy, and distributes the pieces to the selected data storage devices. Referring back to FIG. 3, the spreading module 216 identifies that the hierarchical deployment of the system as shown in FIG. 3 includes two data centers, three racks, and seven nodes that comprise 14 data storage devices. Suppose that a user requests to spread a first data object using a spreading policy W/F=6/3. The user also specifies a protection level that the first data object survive a single node failure. Based on the spreading policy and the protection level, the rule engine 214 determines that the hierarchy rule is [100, 100, 2]. The number 2 associated with the node level in [100, 100, 2] indicates that each node can use up to two data storage devices to store two pieces of data. The spreading module 216 determines that multiple ways to store the pieces of the first data object are possible. For example, the spreading module 216 may determine, to use both data centers at the data center level, the three racks at the rack level, and any six of the seven nodes at the node level to store the six pieces of data with each node storing one piece of data. Alternatively, the spreading module 216 may determine to use the two data centers at the data center level, two racks out of the three racks (e.g., Rack 0 and Rack 2) at the rack level, and any six data storage devices of four nodes at the node level to store the six pieces of data (e.g., BS1 and BS2 of Node 0, BS3 of Node 1, BS8 and BS9 of Node 4, and BS14 of Node 7).

This example illustrates one advantage of the distributing algorithm described herein, that is, a user can require the data to be stored under a certain protection level (e.g., failure scenarios) regardless of the actual layout of the storage system and where the data is stored. The spreading module 216 cooperates with other modules/engines to fulfil the user's requirement by actually distributing the data in the system and providing the required protection to the data. Another advantage of the distributing algorithm described herein is that expansion of the system 100 will not invalidate the protection level applied to the data already stored in the system 100.

Figure 4:
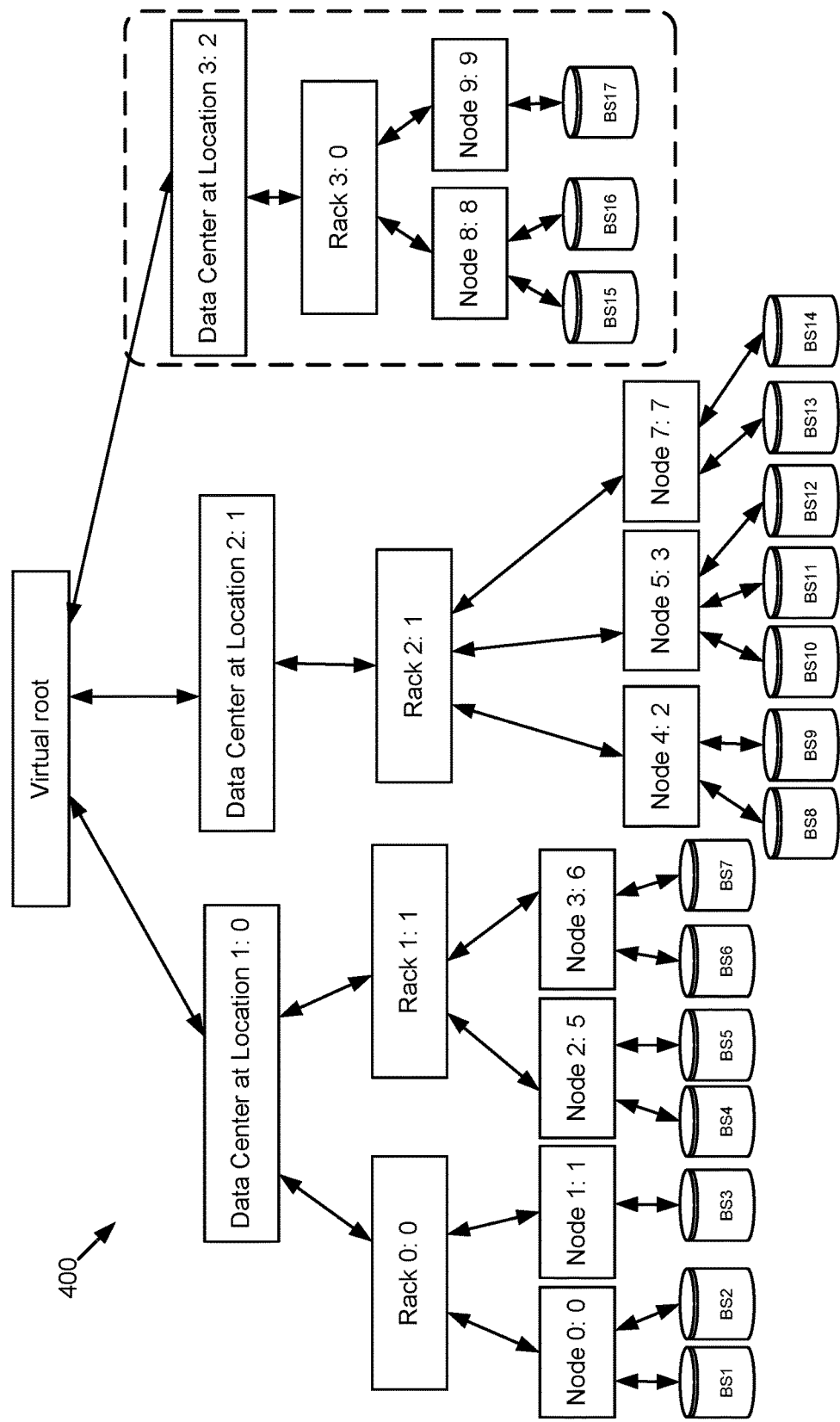
FIG. 4 is a block diagram illustrating an example hierarchic tree structure of the distributed object storage system reconfigured based on the hierarchic tree structure depicted in FIG. 3.

Referring now to FIG. 4, an example hierarchic tree structure 400 of a distributed object storage system reconfigured based on the hierarchic tree structure depicted in FIG. 3 is shown. Compared with the deployment in FIG. 3 and as shown in the dashed-line box, the distributed object storage system in FIG. 4 is expanded to include additional entities: Data Center at Location 3, Rack 3, Node 8 and Node 9, and data storage devices BS15, BS16 and BS17. Continuing with the example above, a first data object was stored in the previous deployment of system 100 (as described by FIG. 3) with a protection level that specified the first data object survive a single node failure. Now suppose that a user requests to store a second data object in the current deployment of the system 100 as shown in FIG. 4. Responsive to the request, the spreading module 216 distributes the second data object in the system 100 of FIG. 4 such that a protection level specified by the user is satisfied. More importantly, the spreading module 216 distributes the second data object without affecting the protection level initially applied to the first data object (i.e., the data of the first data object and the second data object can both recover from a single node failure). In fact, no matter what data (e.g., the second data object) is added or the original data needs to be reconstructed or repaired (e.g., the first data object is recovered from a data storage device failure), the reconfiguration of the system, including the addition, removal, and/or replacement of one or more entities, does not affect the protection level already applied to existing data on the system.

In practice, a set of spreading policies, protection levels (e.g., failure scenarios), and hierarchy rules can be predefined for most common use cases of a distributed object storage system when the system is installed. To reduce the incompatibility between the hierarchy rule and the actual deployment configuration and to minimize the information a user needs to know about the system configuration and work mechanism, the user may be provided the predefined policies and protection levels such that the user has a clear vision of what kind of failure scenarios the data object would survive.

A simple use case is to apply the hierarchy rule [100, 100, 1] in the system 100. In this case, the spreading module 216 distributes a single piece of data to a single data storage device per node to meet concurrent failure requirement F (F>1) in the spreading policy W/F. There is no additional restriction for the data center level and the rack level. To satisfy this use case, the first two elements of the hierarchy rule (i.e., the data center and rack elements) can be any number that is greater than the spreading width W of the spreading policy W/F.

Another use case allows a data object to be reconstructed and recovered from a single node failure and two additional data storage device failures. Suppose the spreading policy is W/F=18/5, which means as much as 5 pieces of data can go missing and the remaining 13 pieces of data can be used to correctly reconstruct the data object. According to the protection policy, two data storage devices (whether they are on one node or across multiple nodes) are allowed to fail, which means that two pieces of data stored on the failed data storage devices may be lost. To ensure that the data object can be recovered when taking into account the two data storage device failures, the rule engine 214 determines that any single node can store at most three pieces of data. As a result, the rule engine 214 determines a hierarchy rule [100, 100, 3] that forces each node to store at most three pieces of data across three data storage devices. Losing a single node and two additional data storage devices mean losing at most three pieces of data plus two pieces of data. In total, up to five data pieces are lost, which is within the maximum tolerance F=5. The data object is therefore protected from a single node failure and two additional data storage device failures.

In one embodiment, the system 100 includes six nodes and each node has 98 data storage devices. When spreading the 18 data pieces across the six nodes using the hierarchy rule [100, 100, 3], the spreading module 216 can store these data pieces on a single data center/rack or multiple data centers/racks with no restriction applied on the data center level and the rack level. To make the hierarchy rule [100, 100, 3] viable over the six nodes, the spreading module 216 uses every node of the six nodes and stores exactly 3 pieces of data on each node based on the maximum number 3 associated with the node level.

In yet another use case, a user selects a spreading policy of 18 pieces of data and tolerance for loss of 8 pieces of data, i.e., W/F=18/8. The protection level includes a single data center failure and two additional data storage devices. The system 100 includes three different data centers. Each data center has six nodes with each node having 98 data storage devices. The rule engine 214 determines the hierarchy rule to be [6, 100, 100] because six additional pieces of data can go missing when two pieces of data on two data storage devices are lost, i.e., each data center should not have more than six pieces of data. In implementing the hierarchy rule, the spreading module 216 spreads out the 18 pieces of data on all three data centers with each data center storing exactly six pieces of data. In some embodiments, the rule engine 214 may also determine the hierarchy rule to be [6, 100, 2]. Since each node can store at most two pieces of data and each data center stores six pieces of data, the spreading module 216 spreads six pieces of data to at least three nodes of each data center with each node storing one or two pieces of data.

The user interface engine 218, stored on memory 204 and configured to be executed by the processor 202, generates graphical data for displaying a user interface. In some embodiments, the user interface engine 218 communicates with the rule engine 214 and the spreading module 216 to generate graphical data for displaying predefined spreading policies and protection levels including a set of tolerable failure scenarios to a user. In other embodiments, the user interface engine 218 generates a user interface for receiving a selection of a spreading policy and a protection level from a user. In some other embodiments, the user interface engine 218 receives instructions from the rule engine 214 to generate a user interface to notify the user to modify a spreading policy, a protection policy, and/or a set of tolerable failure scenarios. The user interface engine 218 may also communicate with the spreading module 216 to generate a user interface to notify the user of incompatibility between a hierarchy rule and an actual hierarchical deployment configuration of a distributed object storage system, and instruct the user to modify a spreading policy and/or a protection level such that a hierarchy rule that is generated based on the modified spreading policy and/or the protection level is compatible with the hierarchical deployment configuration.

Figure 5:
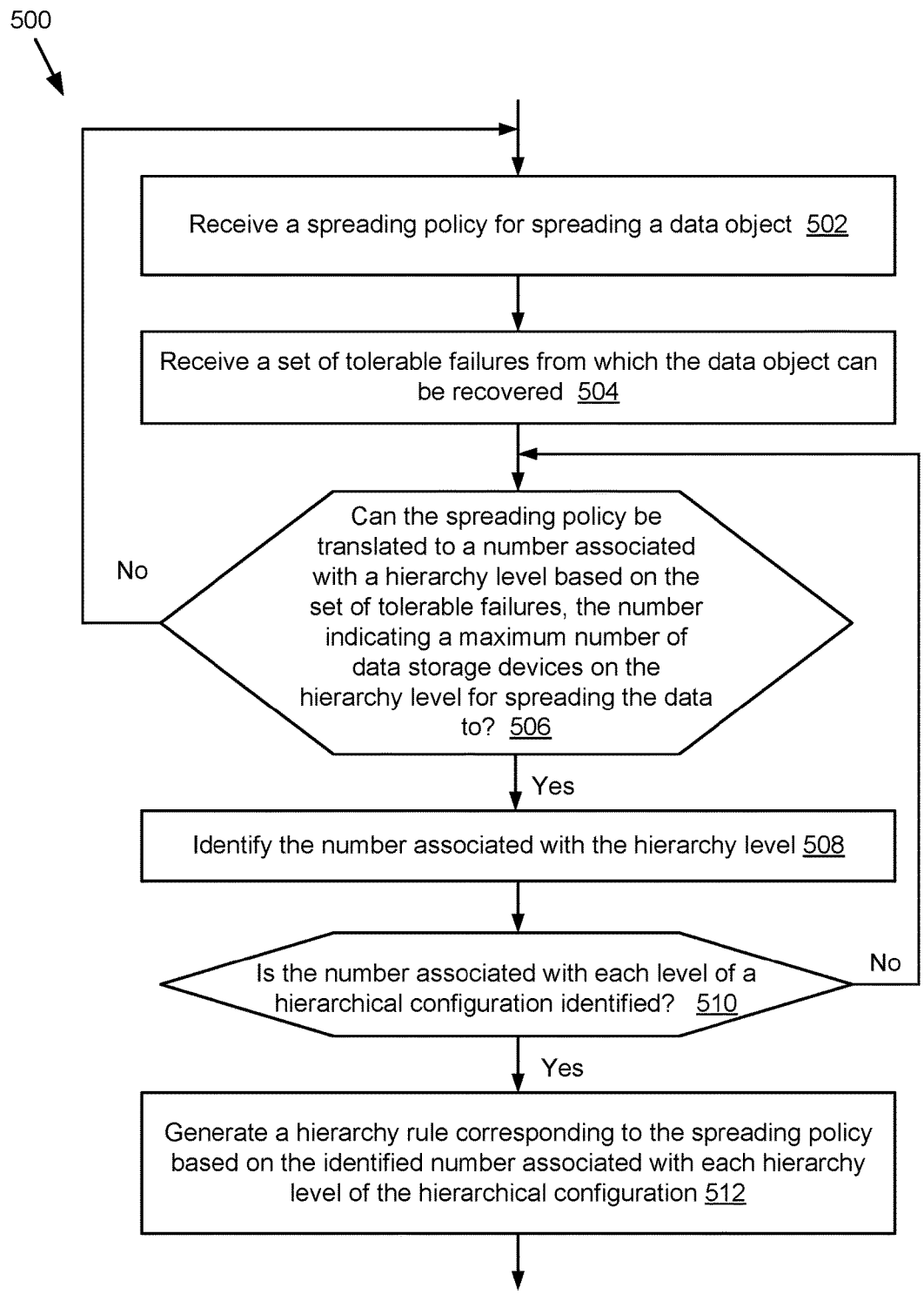
FIG. 5 is a flowchart of an example method for generating a hierarchy rule, according to the techniques described herein.

FIG. 5 is a flowchart of an example method 500 for generating a hierarchy rule. At 502, the rule engine 214 receives a spreading policy W/F for spreading a data object. At 504, the rule engine 214 receives a set of tolerable failures from which the data object can be recovered.

At 506, the rule engine 214 determines whether the spreading policy can be translated to a number associated with a hierarchy level based on the set of tolerable failures, the number indicating a maximum number of data storage devices on the hierarchy level for spreading the data to. As shown in FIGS. 3 and 4, a distributed object storage system has a hierarchic tree structure that includes a data center level, a rack level and a node level. For example, a user may specify the spreading policy W/F=15/3 for spreading a data object, and require that the data object be correctly restored after two node failures with each node storing at least two data pieces. However, the rule engine 214 determines that at most one failure can be tolerated if each node stores two data pieces. In such case, the rule engine 214 determines that the spreading policy cannot be translated to the number associated with the hierarchy level, the method 500 returns to step 502.

Responsive to determining that the spreading policy can be translated to a number associated with the hierarchy level, at 508, the rule engine 214 identifies the number associated with the hierarchy level. For example, if a user specifies that the spreading policy is W/F=18/5 and up to two racks can fail, the rule engine 214 determines that at most two data pieces can be put on each rack to satisfy the requirement of F=5 and two rack failure tolerance, and identifies that the number associated with the rack level is 2.

At 510, the rule engine 214 determines whether the number associated with each level of a hierarchical configuration, for example, the data center level, the rack level and the node level as shown in FIGS. 3 and 4, is identified. If the number associated with each level of the hierarchical configuration has not been identified, the method returns to step 506 to determine the number. If the number associated with each level of the hierarchical configuration has been identified, at 512, the rule engine 214 generates a hierarchy rule corresponding to the spreading policy based on the identified number associated with each hierarchy level of the hierarchical configuration.

Figure 6A:
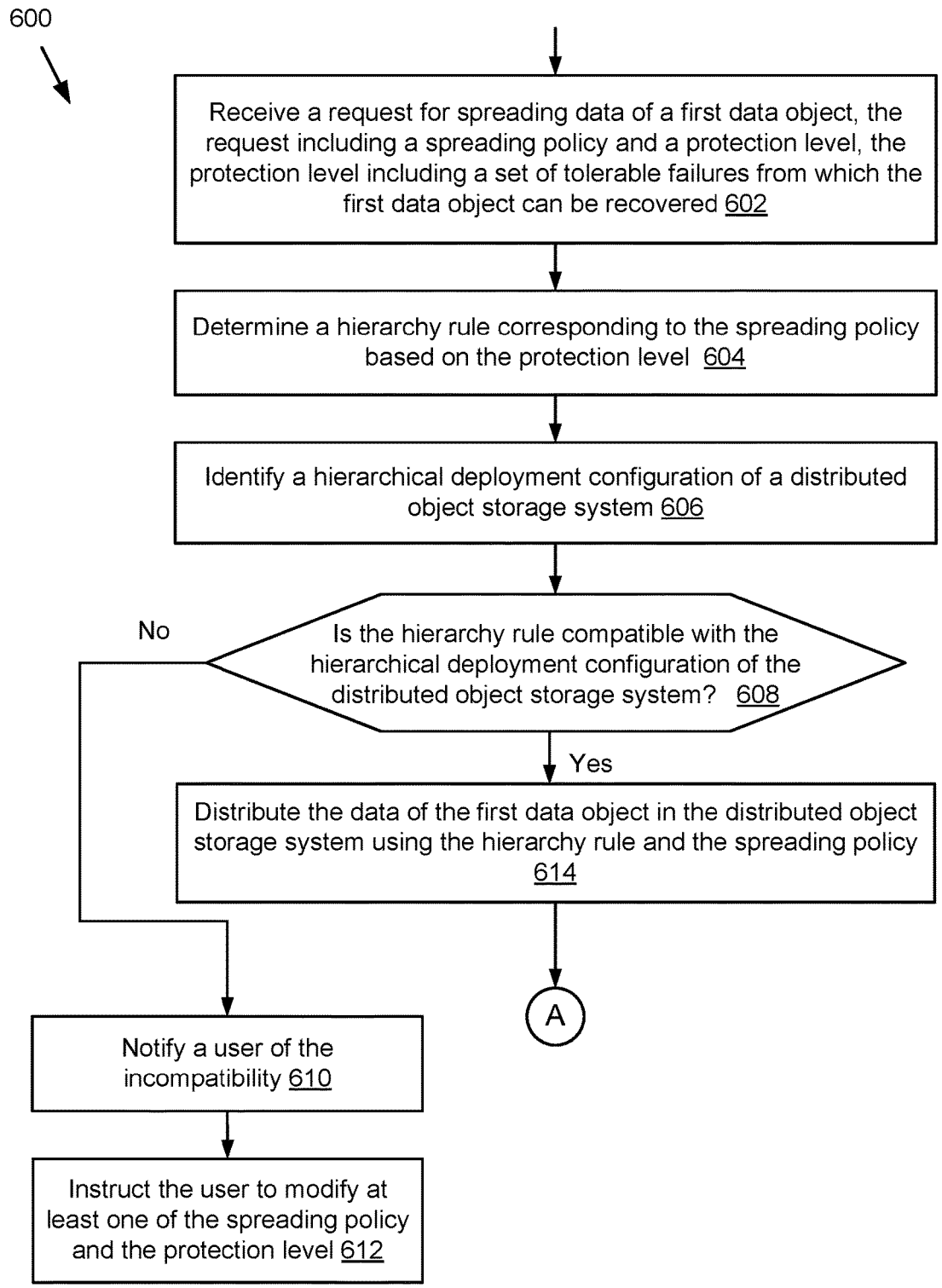
FIGS. 6A and 6B are a flowchart of an example method for distributing a data object in the distributed object storage system using a hierarchy rule and a spreading policy, according to the techniques described herein.
Figure 6B:
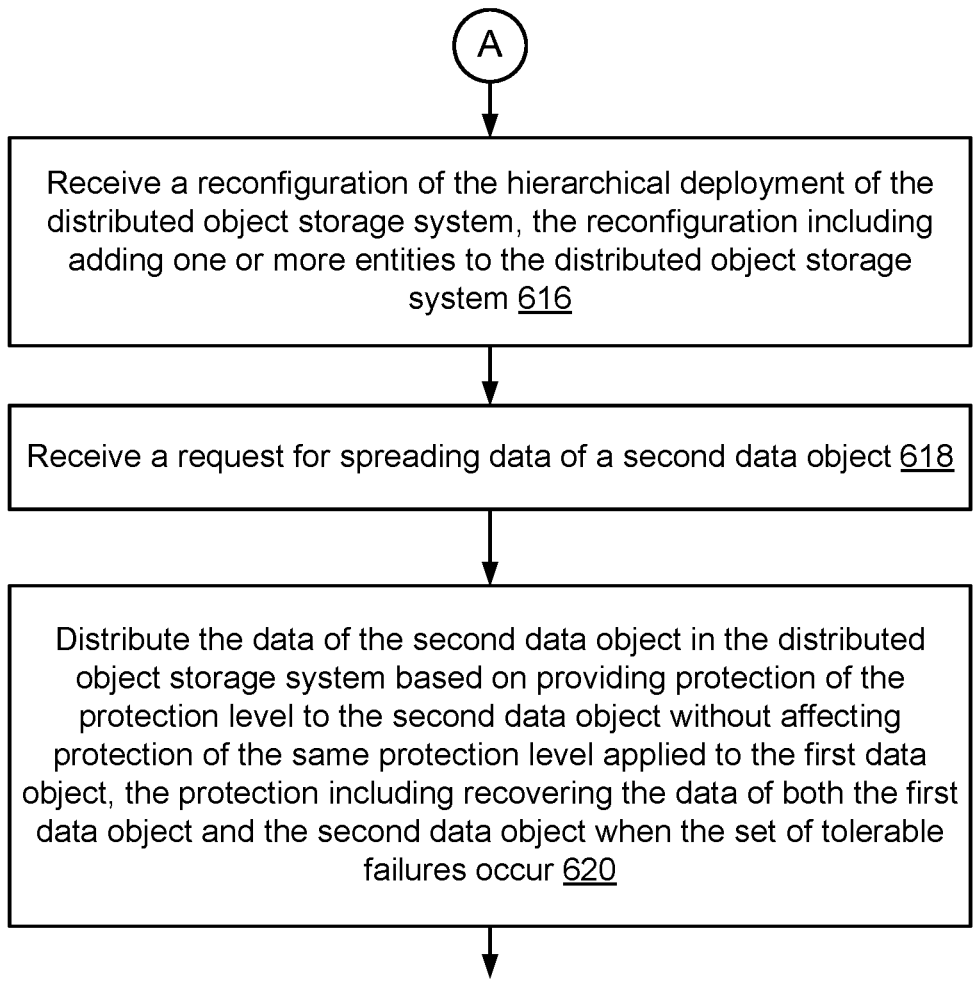

FIGS. 6A and 6B depict a flowchart of an example method 600 for distributing a data object in the distributed object storage system using a hierarchy rule and a spreading policy. At 602, the rule engine 214 receives a request for spreading a first data object, the request including a spreading policy and a protection level, the protection level including a set of tolerable failures from which the first data can be recovered. At 604, the rule engine 214 determines a hierarchy rule corresponding to the spreading policy based on the protection level. The rule engine 214 sends the hierarchy rule to the spreading module 216.

At 606, the spreading module 216 identifies a hierarchical deployment configuration of a distributed object storage system. For example, the spreading module 216 identifies that the distributed object storage system in FIG. 3 includes two data centers, three racks and seven nodes that comprise 14 data storage devices. At 608, the spreading module 216 determines whether the hierarchy rule is compatible with the hierarchical deployment configuration of the distributed object storage system. Responsive to determining that the hierarchy rule is incompatible with the hierarchical deployment configuration of the distributed object storage system, the spreading module 216 notifies 610 a user of the incompatibility and instructs 612 the user to modify the spreading policy and/or the protection level. For example, the rule engine 214 determines a maximum number of 5 on the data center level of a hierarchy rule when a user selects a spreading policy W/F=18/5 to distribute a first data object and specifies that the first data object should be protected from a single data center failure. However, if the spreading module 216 identifies that the actual hierarchical deployment configuration of the distributed object storage system includes only two data centers, the spreading module 216 determines that this hierarchy rule cannot be fulfilled because at most 10 data pieces can be stored on the two data centers (e.g., 5 on each data center), which is less than 18 data pieces selected in the spreading policy. The spreading module 216 notifies the user to change either the spreading policy or the protection level.

Responsive to determining that the hierarchy rule is compatible with the hierarchical deployment configuration of the distributed object storage system, the spreading module 216 distributes 614 the data of the first data object in the distributed object storage system using the hierarchy rule and the spreading policy.

Referring now to FIG. 6B, at 616, the rule engine 214 receives a reconfiguration of the hierarchical deployment of the distributed object storage system, the reconfiguration including adding one or more entities to the distributed object storage system. For example, the system is updated to include a third data center as depicted in the example of FIG. 4. At 618, the rule engine 214 receives a request for spreading data of a second data object. At 620, the spreading module 216 distributes the data of the second data object in the distributed object system, wherein distributing the data of the second data object provides protection of the protection level to the second data object without affecting protection of the same protection level applied to the first data object, the protection including recovering the data of both the first data object and the second data object when the set of tolerable failures occur. In other words, the layout change of the distributed object storage system does not invalidate the protection level applied to the data already stored in the system.

Systems and methods for distributing a data object in a distributed data storage system using a hierarchy rule that is generated based on a spreading policy and a set of tolerable failures specified by a user in absence of deployment information of the distributed data storage system has been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of data storage device including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:
1. A computer-implemented method comprising:
 receiving, by one or more processors of a controller node, a request for spreading data of a data object, the request including:

a spreading policy defining a number of data storage devices storing a portion of the data object that are allowed to fail; and a protection level defining a set of tolerable failure scenarios;

determining, by the one or more processors, a hierarchy rule corresponding to the spreading policy based on the protection level; and distributing, by the one or more processors, the data of the data object in a distributed object storage system using the hierarchy rule and the spreading policy, such that the protection level applies to the data object and a previously-stored data object to ensure that data of the data object and data of the previously-stored data object is recovered responsive to a failure scenario of the set of tolerable failure scenarios occurring.

2. The computer-implemented method of claim 1, wherein determining the hierarchy rule corresponding to the spreading policy comprises:

determining whether the spreading policy can be translated to a value associated with a hierarchy level based on the set of tolerable failure scenarios, the value indicating a maximum number of data storage devices on the hierarchy level for spreading the data of the data object to;

determining whether the value associated with the hierarchy level has been identified; and in response to determining that the value associated with the hierarchy level has been identified, generating the hierarchy rule corresponding to the spreading policy based on the identified value.

3. The computer-implemented method of claim 2, further comprising:

identifying a hierarchical deployment configuration of the distributed object storage system; and determining whether the hierarchy rule is compatible with the hierarchical deployment configuration of the distributed object storage system, wherein distributing the data of the data object in the distributed object storage system is based on determining that the hierarchy rule is compatible with the hierarchical deployment configuration of the distributed object storage system.

4. The computer-implemented method of claim 3, wherein:

determining whether the hierarchy rule is compatible with the hierarchical deployment configuration of the distributed object storage system comprises determining whether each entity of the hierarchy level meets the maximum number of data storage devices associated with the hierarchy level without receiving information of data storage devices used at other entities of the hierarchy level; and an entity includes at least one of a storage node, a rack, and a data center.

5. The computer-implemented method of claim 3, further comprising:

in response to determining that the hierarchy rule is incompatible with the hierarchical deployment configuration of the distributed object storage system:

notifying a user; and instructing the user to modify the spreading policy or the protection level.

6. The computer-implemented method of claim 2, wherein the hierarchy level comprises:

a level where the data storage devices are grouped according to respective storage nodes;

a level where the storage nodes are grouped to respective racks; and a level where the racks are grouped according to respective data centers.

7. The computer-implemented method of claim 1, wherein the spreading policy comprises:

a desired spreading width; and a maximum concurrent failure tolerance.

8. A distributed object storage system comprising:

a controller node having a memory and one or more processors configured to execute instructions stored on the memory, wherein the controller node is configured to perform operations comprising:

receiving a request for spreading data of a data object, the request including:

a spreading policy defining a number of data storage devices storing a portion of the data object that are allowed to fail; and a protection level defining a set of tolerable failure scenarios;

determining a hierarchy rule corresponding to the spreading policy based on the protection level; and distributing the data of the data object in the distributed object storage system using the hierarchy rule and the spreading policy, such that the protection level applies to the data object and a previously-stored data object to ensure that data of the data object and data of the previously-stored data object is recovered responsive to a failure scenario of the set of tolerable failure scenarios occurring.

9. The distributed object storage system of claim 8, wherein to determine the hierarchy rule corresponding to the spreading policy, the operations further comprise:

determining whether the spreading policy can be translated to a number associated with a hierarchy level based on the set of tolerable failure scenarios, the number indicating a threshold number of data storage devices on the hierarchy level onto which the data object is to be spread;

determining whether the number associated with each hierarchy level of a hierarchical configuration has been identified; and in response to determining that the number associated with each hierarchy level of the hierarchical configuration has been identified, generating the hierarchy rule corresponding to the spreading policy based on the identified number.

10. The distributed object storage system of claim 9, wherein the operations further comprise:

identifying a hierarchical deployment configuration of the distributed object storage system; and determining whether the hierarchy rule is compatible with the hierarchical deployment configuration of the distributed object storage system, wherein distributing the data of the data object in the distributed object storage system is based on determining that the hierarchy rule is compatible with the hierarchical deployment configuration of the distributed object storage system.

11. The distributed object storage system of claim 10, wherein to determine whether the hierarchy rule is compatible with the hierarchical deployment configuration of the distributed object storage system, the controller node is further configured to perform the operations comprising determining whether an entity of the hierarchy level meets the threshold number of data storage devices associated with the hierarchy level without receiving information of data storage devices used at other entities of the hierarchy level.

12. The distributed object storage system of claim 10, wherein the operations further comprise:
in response to determining that the hierarchy rule is incompatible with the hierarchical deployment configuration of the distributed object storage system:
notifying a user; and
instructing the user to modify at least one of the spreading policy and the protection level.

13. The distributed object storage system of claim 9, wherein the hierarchy level comprises:
a level where the data storage devices are grouped according to respective storage nodes;
a level where the storage nodes are grouped to respective racks; and
a level where the racks are grouped according to respective data centers.

14. The distributed object storage system of claim 8, wherein the spreading policy comprises:
a desired spreading width; and
a maximum concurrent failure tolerance.

15. A distributed object storage system comprising:
means for receiving a request for spreading data of a data object, the request including:
a spreading policy defining a number of data storage devices storing a portion of the data object that are allowed to fail; and
a protection level defining a set of tolerable failure scenarios;
means for determining a hierarchy rule corresponding to the spreading policy based on the protection level; and
means for distributing the data of the data object in a distributed object storage system using the hierarchy rule and the spreading policy, such that the protection level applies to the data object and a previously-stored data object to ensure that data of the data object and data of the previously-stored data object is recovered responsive to a failure scenario of the set of tolerable failure scenarios occurring.

16. The distributed object storage system of claim 15, wherein the means for determining the hierarchy rule corresponding to the spreading policy comprises:
means for determining whether the spreading policy can be translated to a value associated with a hierarchy level based on the set of tolerable failure scenarios, the value indicating a threshold number of data storage devices on the hierarchy level over which to spread the data object; and
means for generating the hierarchy rule corresponding to the spreading policy based on the value associated with the hierarchy level.

17. The distributed object storage system of claim 16, further comprising:
means for identifying a hierarchical deployment configuration of the distributed object storage system; and
means for determining whether the hierarchy rule is compatible with the hierarchical deployment configuration of the distributed object storage system, wherein distributing the data of the data object in the distributed object storage system is based on determining that the hierarchy rule is compatible with the hierarchical deployment configuration of the distributed object storage system.

18. The distributed object storage system of claim 17, further comprising:
means for notifying a user in response to determining that the hierarchy rule is incompatible with the hierarchical deployment configuration of the distributed object storage system; and
means for instructing the user to modify the spreading policy and/or the protection level.

19. The distributed object storage system of claim 16, wherein the hierarchy level comprises:
a level where the data storage devices are grouped according to respective storage nodes;
a level where the storage nodes are grouped to respective racks; and
a level where the racks are grouped according to respective data centers.

20. The distributed object storage system of claim 15, wherein the spreading policy comprises:
a desired spreading width; and
a maximum concurrent failure tolerance.

* * * * *